(12) United States Patent
Jakobsson

(10) Patent No.: US 8,578,174 B2
(45) Date of Patent: Nov. 5, 2013

(54) EVENT LOG AUTHENTICATION USING SECURE COMPONENTS

(75) Inventor: Bjorn Markus Jakobsson, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 320 days.

(21) Appl. No.: 12/818,163

(22) Filed: Jun. 18, 2010

(65) Prior Publication Data

US 2011/0314297 A1  Dec. 22, 2011

(51) Int. Cl.
*G06F 11/30* (2006.01)
*G06F 12/14* (2006.01)

(52) U.S. Cl.
USPC .......................................................... 713/189

(58) Field of Classification Search
USPC .......................................................... 713/189
See application file for complete search history.

(56) References Cited

U.S. PATENT DOCUMENTS

| 4,653,048 A * | 3/1987 | Anderson et al. ............... 714/49 |
| 2006/0190743 A1 * | 8/2006 | Okaue ........................... 713/193 |

* cited by examiner

*Primary Examiner* — Kambiz Zand
*Assistant Examiner* — Stephen Sanders
(74) *Attorney, Agent, or Firm* — Shun Yao; Park, Vaughan, Fleming & Dowler LLP

(57) ABSTRACT

Some embodiments provide a system that facilitates use of a computing device. During operation, the system obtains an event description of an event on the computing device. Next, the system computes a message authentication code (MAC) for the event description using a secure component associated with the computing device. Finally, the system uses the MAC to maintain the integrity of an event log containing the event description.

23 Claims, 5 Drawing Sheets

EVENT LOG AUTHENTICATION USING SECURE COMPONENTS

BACKGROUND

1. Field

The present embodiments relate to event logging on computing devices. More specifically, the present embodiments relate to techniques for authenticating event logs using secure components associated with the computing devices.

2. Related Art

Malware is malicious software that is designed to infiltrate or damage a computing device without an owner's informed consent. Malware can include computer viruses, worms, Trojan horses, rootkits, spyware, adware, and so on. Malware has become a common way to commit online fraud. An intrusion detection system is software and/or hardware designed to detect unwanted attempts at accessing, manipulating, or disabling of computer systems through a network.

Signature detection is a technique often used in intrusion detection systems. In the signature detection process, network or system information is scanned against a known attack or malware signature database. If a match is found, an alert takes place for further actions. This technique requires the signatures to be constantly updated in order to mitigate emerging threats. Moreover, malware programmers increasingly utilize code obfuscation techniques to cloak their malware. For example, malware programmers can use polymorphic algorithms to mutate their codes, thus making it difficult for intrusion detection systems to detect the malicious codes.

Another commonly used technique in intrusion detection systems is anomalous behavior detection. In the anomalous behavior detection process, the intrusion detection systems generate a statistical baseline of the traffic on a network, and flag any traffic that does not fit the statistical norm behavior. However, the anomalous behavior detection is both costly and prone to errors.

In addition, with the explosive adoption rates of smart phones and other types of mobile devices, mobile malware infection is expected to escalate in the near future. Because mobile devices have inherent limitations, such as power, memory, and bandwidth, current intrusion detection systems are not well suited to protect mobile devices against malware attacks.

SUMMARY

Some embodiments provide a system that facilitates use of a computing device. During operation, the system obtains an event description of an event on the computing device. Next, the system computes a message authentication code (MAC) for the event description using a secure component associated with the computing device. Finally, the system uses the MAC to maintain the integrity of an event log containing the event description.

In some embodiments, the system also stores the MAC and the event description in a log entry within the event log.

In some embodiments, the system also increments a counter associated with the event log upon obtaining the event description and stores the counter in the log entry.

In some embodiments, the event log is stored on the computing device or on an external storage device.

In some embodiments, computing the MAC for the event description using the secure component involves:
 (i) providing the event description to the secure component;
 (ii) computing the MAC using a key from the secure component,
  wherein the key is inaccessible to the computing device; and
 (iii) obtaining the MAC from the secure component.

In some embodiments, using the MAC to maintain the integrity of the event log involves sending the event log to an auditing apparatus with access to the key, and authenticating the event log using the auditing apparatus.

In some embodiments, the auditing apparatus authenticates the event log to detect corruption of the event log.

In some embodiments, the secure component is at least one of a smart card, an external computing device, and a secure software component.

BRIEF DESCRIPTION OF THE FIGURES

In the figures, like reference numerals refer to the same figure elements.

DETAILED DESCRIPTION

Figure 1:
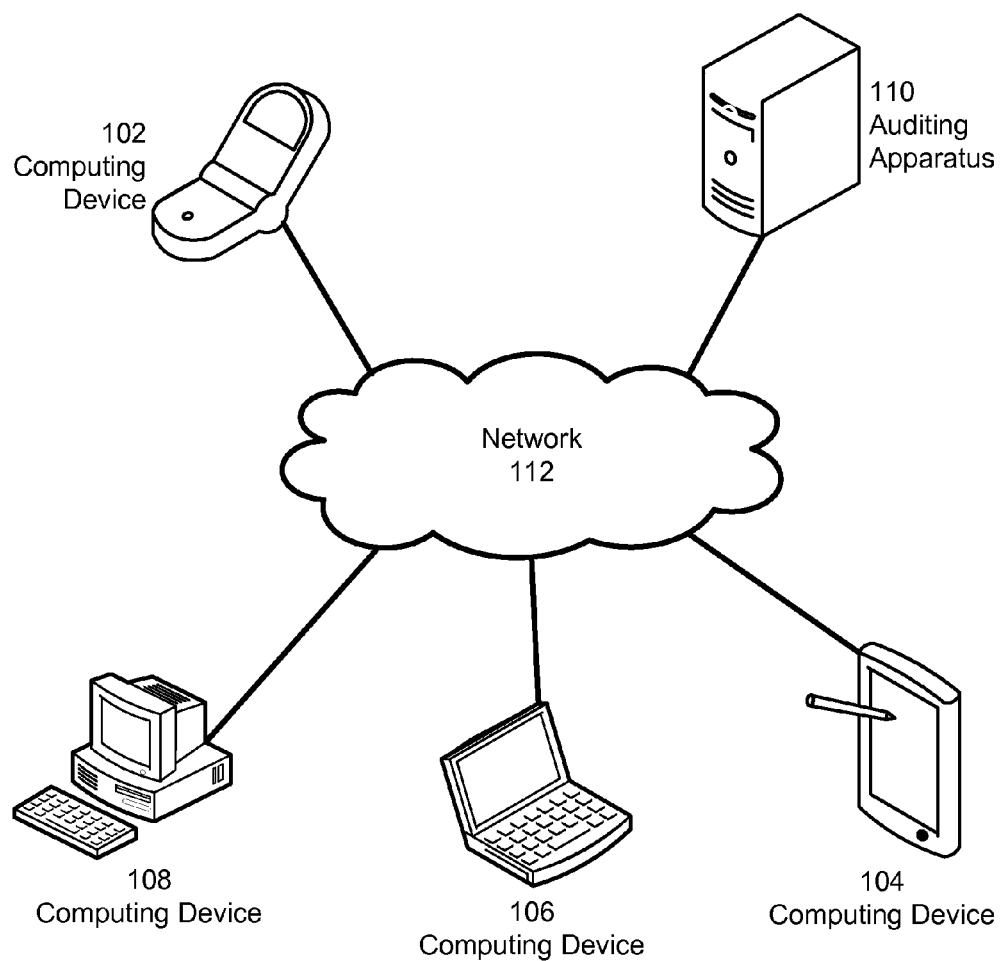
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for maintaining and processing an event log for a computing device. The event log may correspond to a record of events on a computing device, such as a personal computer, laptop computer, mobile phone, portable media player, and/or other type of electronic device. Each log entry in the event log may thus include an event description of an event on the computing device.

More specifically, embodiments provide a method and system for maintaining the integrity of the event log. The computing device may be associated with a secure component such as a smart card, an external computing device, and/or a secure software component. The secure component may use a key to generate a message authentication code (MAC) for each log entry in the event log. In addition, the key may be inaccessible to the computing device. As a result, the MAC may be used to authenticate the event log. For example, the MAC may be stored in the log entry along with the event description. An auditing apparatus with access to the key may receive the log entry, compute the MAC, and compare the computed MAC with the stored MAC in the log entry. If the two MACs are identical, the integrity of the log entry is verified; if the two MACs differ, corruption in the log entry may be detected.

FIG. 1 shows a schematic of a system in accordance with an embodiment. As shown in FIG. 1, the system includes a number of computing devices 102-108 and an auditing apparatus 110. Computing devices 102-108 may be connected to each other and to auditing apparatus 110 through a network 112. Each of these components is discussed in further detail below.

Computing devices 102-108 may correspond to electronic devices that provide services or functions to a user. For example, computing devices 102-108 may operate as mobile phones, personal computers (PCs), laptop computers, workstations, global positioning system (GPS) receivers, portable media players, and/or personal digital assistants (PDAs). In addition, each computing device 102-108 may include an operating system (not shown) that coordinates the use of hardware and software resources on the computing device, as well as one or more applications that perform specialized tasks for the user. For example, computing devices 102-108 may include applications such as an email client, address book, document editor, web browser, accounting application, calendar application, and/or media player. To perform tasks for the user, applications may obtain the use of hardware resources (e.g., processor, memory, I/O components, network interface card, graphics-processing unit (GPU), etc.) from the operating system, as well as interact with the user through a hardware and/or software framework provided by the operating system.

Network 112 may correspond to a local area network (LAN), wide area network (WAN), wireless network, mobile phone network, Bluetooth (Bluetooth™ is a registered trademark of Bluetooth Sig, Inc.) network, intranet, Internet, and/or other type of network that facilitates communication among computing devices 102-108 through one or more communications channels. For example, users of computing devices 102-108 may connect to network 112 to send and receive emails, retrieve webpages, make phone calls, send and receive Short Message Service (SMS) messages, and/or transfer files with one another. At the same time, network 112 may enable the spread of malware, such as viruses, Trojan horses, worms, and/or spyware, among computing devices 102-108.

In one or more embodiments, events in computing devices 102-108 are stored in one or more event logs. Such events may correspond to application, system, network, and/or security events on computing devices 102-108. For example, an event may correspond to the installation and/or execution of an application, the loading of a webpage, the manipulation of data, a login attempt, a file access, and/or another operation on computing devices 102-108. Each log entry in an event log for a computing device may contain data related to an event in the computing device. For example, a log entry for the loading of a webpage in a mobile phone may contain the Uniform Resource Locator (URL) of the webpage, a timestamp corresponding to the time at which the webpage was loaded, and/or the application (e.g., web browser) used to load the webpage.

Events stored in event logs may additionally be used to detect bugs, anomalies, and/or intrusion in computing devices 102-108. For example, intrusion detection systems on computing devices 102-108 and/or network 112 may periodically inspect the contents of the event logs for signs of malicious and/or anomalous activity. On the other hand, the event logs may be vulnerable to corruption by malware, malicious users, and/or other entities. In particular, power and/or bandwidth constraints on computing devices 102-108 may result in the insecure storage of event logs directly on the computing devices, which in turn may allow malicious users and/or applications to modify the event logs. For example, malware on a laptop computer may erase malware-related events from a rewritable event log for the laptop computer to prevent the malware from being detected through inspection of the event log.

In one or more embodiments, the system of FIG. 1 includes functionality to authenticate event logs for computing devices 102-108. Each computing device may be associated with a secure component that contains code and/or data that is inaccessible from the computing device. For example, the secure component may correspond to a smart card, an external computing device, and/or a secure software component on the computing device. The secure component may compute a message authentication code (MAC) for each log entry for the computing device using a key that is inaccessible to the computing device. The MAC may then be stored within the log entry and used to maintain the integrity of an event log containing the log entry. In particular, auditing apparatus 110 may have access to the key and may authenticate the event log by re-computing the MAC for each log entry in the event log. As discussed below with respect to FIG. 2, the integrity of the log entry may be verified if the re-computed MAC is identical to the stored MAC, while corruption of the log entry may be detected if the re-computed MAC differs from the stored MAC.

Figure 2:
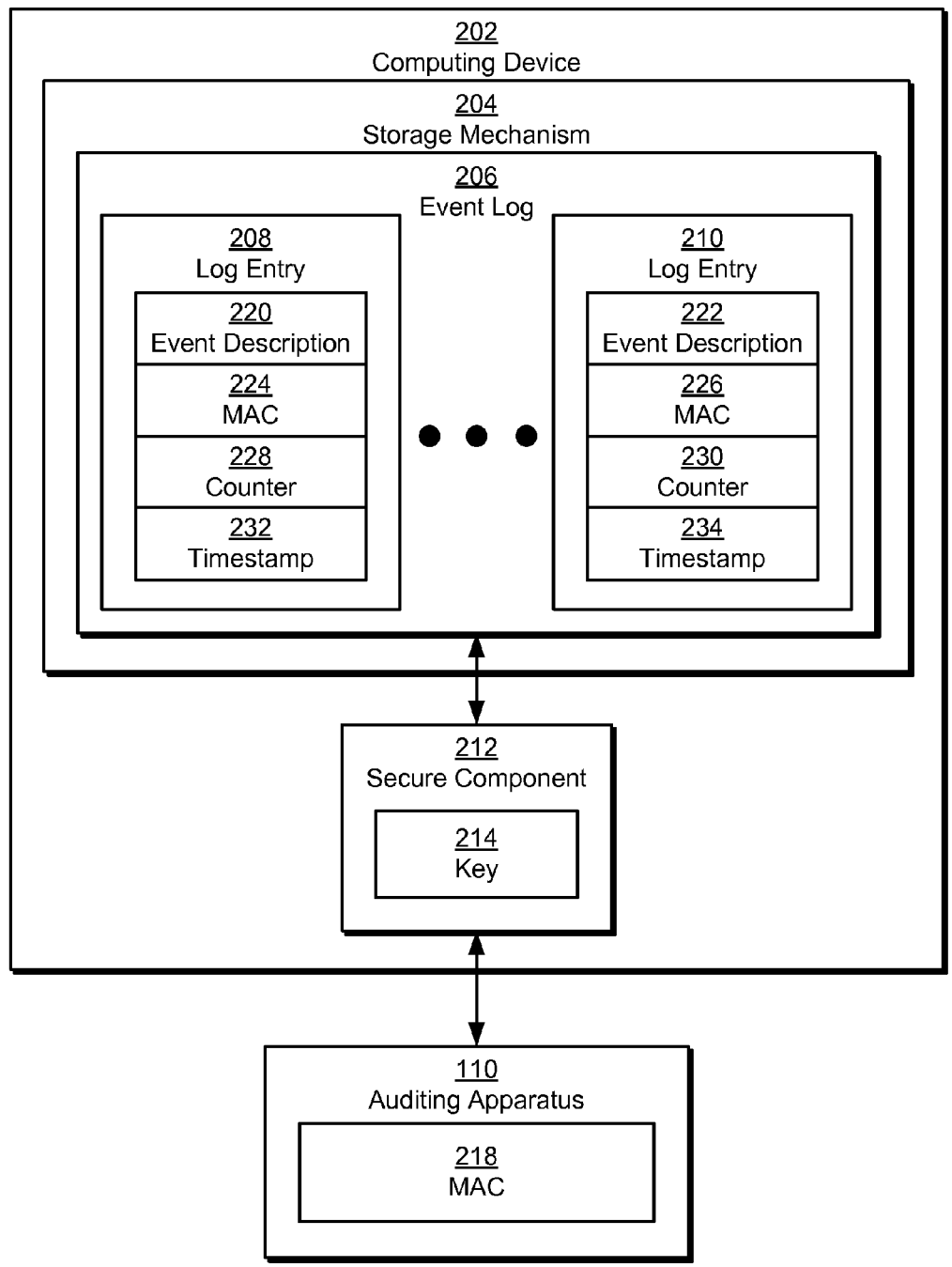
FIG. 2 shows the processing of an event log in accordance with an embodiment.

FIG. 2 shows the processing of an event log 206 in accordance with an embodiment. As described above, event log 206 may correspond to a record of events on a computing device 202 such as a PC, laptop computer, mobile phone, PDA, and/or portable media player. Event log 206 includes a set of log entries 208-210, with each log entry corresponding to an event on computing device 202. For example, events on computing device 202 may be queued by an operating system (not shown) on computing device 202, stored in event log 206 by a storage mechanism 204 on computing device 202, then executed on a processor (not shown) in computing device 202.

As shown in FIG. 2, each log entry 208-210 includes an event description 220-222, a MAC 224-226, a counter 228-230, and a timestamp 232-234. In addition, the log entry may be created using a secure component 212 associated with computing device 202. Secure component 212 may correspond to a secure hardware and/or software component within computing device 202. For example, secure component 212 may be a subscriber identity module (SIM) card on a mobile phone, an expansion card on a laptop or personal computer, and/or an untamperable software module. Alternatively, secure component 212 may be provided by an external computing device. For example, a secure component for a mobile phone may be provided by a digital camera that communicates with the mobile phone over a Bluetooth connection.

In one or more embodiments, secure component 212 obtains event descriptions 220-222 for events in computing device 202 and computes MACs 224-226 for the events using a key 214 that is inaccessible to computing device 202. For example, secure component 212 may apply a cryptographic hash function to event description 220 to obtain MAC 224 as a 128-bit hash value. Secure component 212 may then provide the computed MACs for subsequent use in authenticating event log 206. Secure component 212 may also increment and return a counter 228-230 for each received event description or computed MAC. In other words, counters 228-230 may enumerate log entries 208-210 in event log 206 and may facilitate the detection of deleted entries in event log 206, as discussed below.

Storage mechanism 204 may then create a log entry containing the event description, MAC, and counter, along with a timestamp of the event. For example, the hanging of an application on computing device 202 may be stored in a log entry with an event description of "Hanging application ABC.EXE, version 1.0.0.1," a hash-based MAC (HMAC) computed using a cryptographic hash function, a counter of 324 to represent the $324^{th}$ log entry in event log 206, and a timestamp of "4/30/2010 02:15:54."

MACs 224-226 and/or counters 228-230 may subsequently be used to maintain the integrity of log entries 208-210. In particular, log entries 208-210 may be sent to auditing apparatus 110 for authentication. In one or more embodiments, auditing apparatus 110 corresponds to a server and/or other device on a network (e.g., network 112 of FIG. 1) with access to key 214. For example, a telecommunications network service provider may store the keys for all computing devices on the telecommunications network in a repository that is accessible to auditing apparatus 110.

As a result, auditing apparatus 110 may include functionality to compute a MAC 218 from the event description (e.g., event descriptions 220-222) of a log entry using the same key 214 as that used by secure component 212 in computing the MAC (e.g., MACs 224-226) stored within the log entry. Auditing apparatus 110 may then compare MAC 218 to the stored MAC from the log entry. If MAC 218 and the stored MAC are identical, the integrity of the log entry is verified. If MAC 218 differs from the stored MAC, corruption of the log entry may be detected. For example, MAC 218 may differ from the stored MAC if malware modifies the event description for the log entry but cannot forge a valid MAC for the modified event description without access to key 214.

Auditing apparatus 110 may use counters 228-230 to further authenticate event log 206. For example, auditing apparatus 110 may examine counters 228-230 in sequential order for missing numeric values. If log entries 208-210 are correctly enumerated by counters 228-230, all log entries in event log 206 may be intact. However, the omission of numeric values between the lowest counter and the highest counter may represent the deletion of log entries in event log 206. Auditing apparatus 110 may thus use MAC 218 to detect changes to log entries 208-210 and counters 228-230 to detect deletion of log entries 208-210.

Consequently, secure component 212 and auditing apparatus 110 may use log entries 208-210 and key 214 to maintain the integrity of event log 206, even if event log 206 is insecure and/or rewritable. In particular, the individual computation of MACs by secure component 212 and auditing apparatus 110 using a secret key 214 may enable the detection of data corruption in event log 206. Such corruption detection may further facilitate the detection of anomalies and/or intrusion in computing device 202. For example, the authentication of event log 206 by auditing apparatus 110 may prevent malicious users and/or applications from successfully removing traces of malicious activity from event log 206 while simultaneously enabling the detection of malicious behavior associated with corruption of event log 206.

Figure 3:
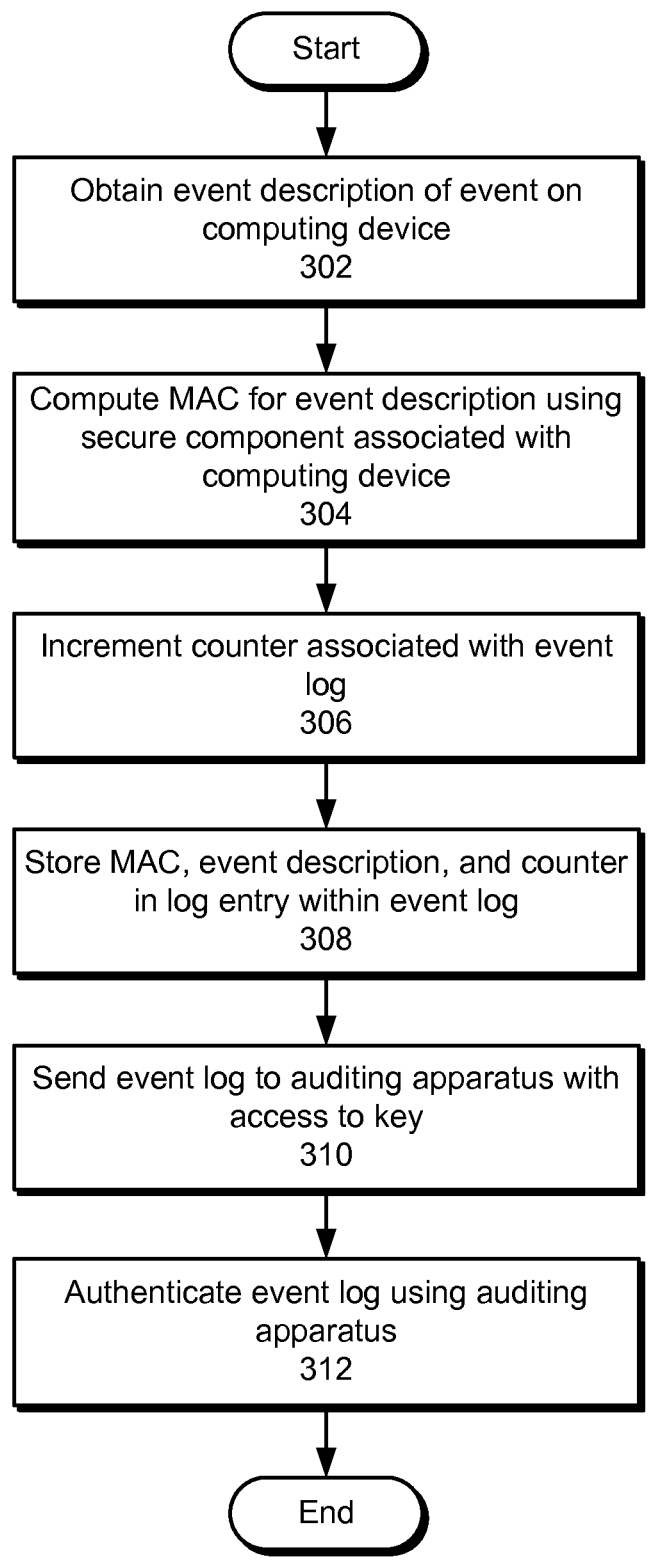
FIG. 3 shows a flowchart illustrating the process of facilitating use of a computing device in accordance with an embodiment.

FIG. 3 shows a flowchart illustrating the process of facilitating use of a computing device in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, an event description of an event on a computing device is obtained (operation 302). The event may correspond to an application, system, network, and/or security event on the computing device. Next, a MAC for the event description is computed using a secure component associated with the computing device (operation 304). The secure component may correspond to a smart card, external computing device, and/or secure software component. To compute the MAC, the event description may be provided to the secure component. The secure component may compute the MAC using a key that is inaccessible to the computing device, and the MAC may be obtained from the secure component.

A counter associated with an event log for the computing device is also incremented (operation 306). The counter may be used to enumerate log entries within the event log and may facilitate detection of deleted log entries from the event log. The MAC, event description, and counter are then stored in a log entry within the event log (operation 308). The event log may be stored on the computing device and/or on an external storage device, such as a server. Moreover, the event log may be rewritable and/or insecure to conform to power and/or bandwidth constraints on the computing device. For example, the log entry may be written to an unencrypted file on the computing device to reduce the use of processor, network and/or battery resources associated with maintaining the event log for the computing device.

Because applications, users, and/or processes on the computing device may be unable to correctly compute (e.g., forge) the MAC without the key, the MAC may be used to maintain the integrity of the event log. More specifically, the event log may be sent to an auditing apparatus with access to the key (operation 310), and the auditing apparatus may be used to authenticate the event log (operation 312). Authentication of the event log by the auditing apparatus is discussed in further detail below with respect to FIG. 4.

Figure 4:
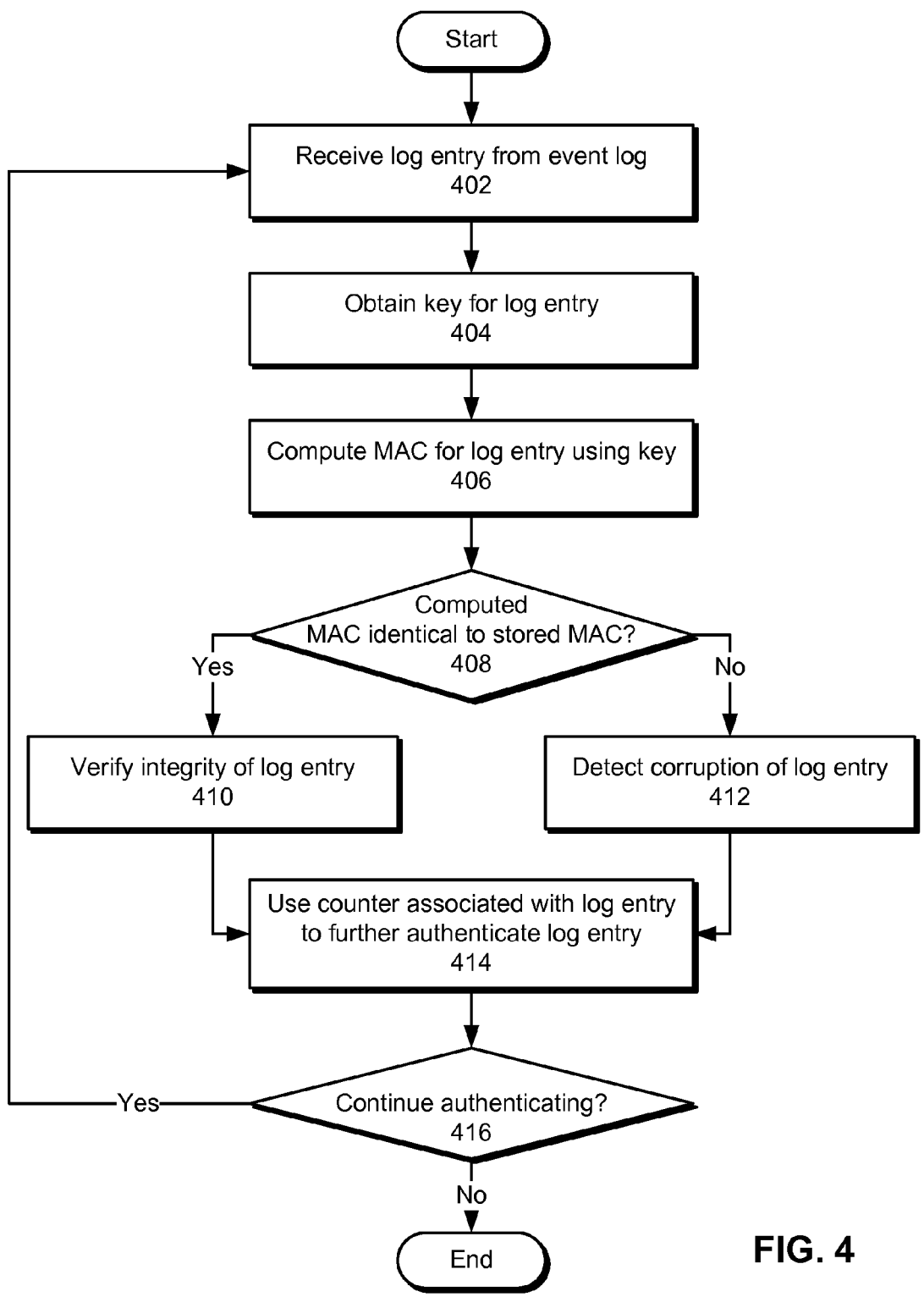
FIG. 4 shows a flowchart illustrating the processing of an event log for a computing device in accordance with an embodiment.

FIG. 4 shows a flowchart illustrating the processing of an event log for a computing device in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a log entry from the event log is received (operation 402). The event log may correspond to a record of events on a computing device. The log entry may be received over a network by an auditing apparatus, such as auditing apparatus 110 of FIG. 1. Next, a key for the log entry is obtained (operation 404). The key may be stored on a secure component associated with the computing device and may be inaccessible to the computing device. In addition, the key may be used to compute a MAC for the log entry (operation 406). For example, an HMAC may be computed from an event description within the log entry using a cryptographic hash function and the key.

The computed MAC may then be used to authenticate the log entry. In particular, the computed MAC may be compared to a stored MAC for the log entry to determine if the two MACs are identical (operation 408). The stored MAC may be computed by the secure component and may be stored in the log entry along with the event description. If the MACs are identical, the integrity of the log entry is verified (operation 410). If the computed MAC differs from the stored MAC, corruption of the log entry may be detected (operation 412). For example, the computed MAC may differ from the stored MAC after malware in the computing device modifies the event description in the log entry but cannot correctly forge a new MAC for the modified event description without the key.

A counter associated with the log entry may be used to further authenticate the log entry (operation 414). The counter may be obtained from the log entry and may facilitate the enumeration of log entries in the event log. As a result, missing numeric values for counters in the event log may correspond to deleted log entries. In other words, the MAC may be used to detect tampering with the log entry, while the counter may be used to detect deletion of one or more log entries.

The event log may continue to be authenticated (operation 416). For example, the event log may be fully authenticated by examining all log entries in the event log for corruption and/or deletion. If authentication is to continue, log entries are received from the event log (operation 402), and MACs are computed for the log entries (operations 404-406). The MACs and/or counters associated with the log entries may then be used to authenticate the log entries (operations 408-414) until all relevant log entries in the event log have been examined for corruption and/or deletion.

Figure 5:
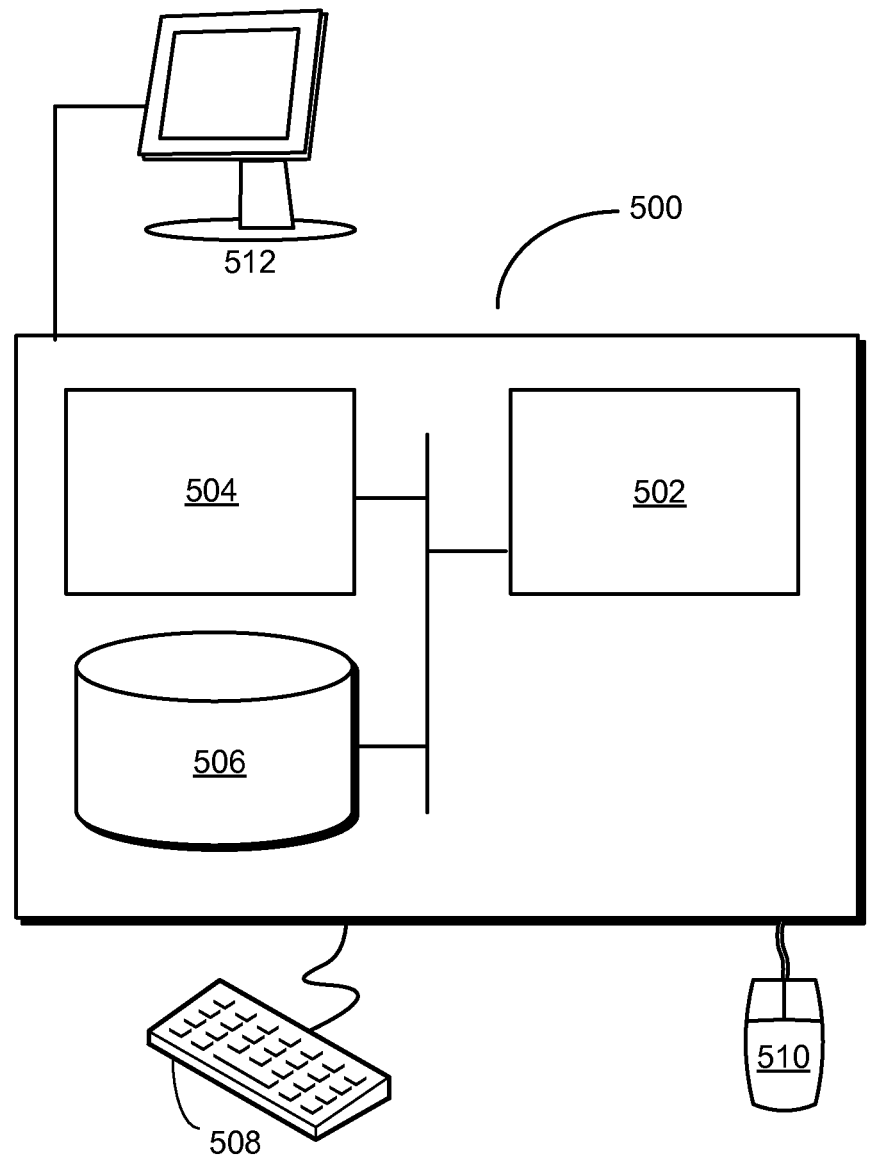
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the use of a computing device. The system may include a secure component that obtains an event description of an event on a computing device and computes a MAC for the event description. The system may also include a storage mechanism that stores the MAC and the event description in an event log for the computing device. Finally, the system may include an auditing apparatus that uses the MAC to maintain the integrity of the event log. In particular, the auditing apparatus may obtain a log entry containing the MAC and the event description from the event log and re-compute the MAC using the key and the event description. The integrity of the log entry may be verified if the computed MAC is identical to the stored MAC for the log entry, while corruption of the log entry may be found if the computed MAC differs from the stored MAC.

In addition, one or more components of computer system 500 may be remotely located and connected to the other components over a network. Portions of the present embodiments (e.g., secure component, auditing apparatus, storage mechanism, etc.) may also be located on different nodes of a distributed system that implements the embodiments. For example, the present embodiments may be implemented using a cloud computing system that facilitates intrusion detection by auditing event logs from a variety of network-enabled computing devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating use of a computing device, comprising:
    obtaining, by the computing device, an event description for an event that has occurred on the computing device, wherein the event description includes a description for one or more of: an application event; a system event; a network event; or a security event;
    responsive to obtaining the event description, computing a message authentication code (MAC) for the event description using a secure component associated with the computing device, wherein the secure component includes a secure key that is inaccessible to the computing device at which the event description and MAC are stored, and wherein the MAC facilitates authenticating the event description using the secure key;
    storing the MAC, in a log entry of an event log, in association with the event description; and
    maintaining the integrity of the event log, which contains one or more event descriptions, based on the associated MACs.

2. The method of claim 1, further comprising:
    incrementing a counter associated with the event log upon obtaining the event description; and
    storing the counter in the log entry.

3. The method of claim 1, wherein the event log is stored on the computing device or on an external storage device.

4. The method of claim 1, wherein computing the MAC for the event description using the secure component involves:
    providing the event description to the secure component;
    computing the MAC using a key from the secure component, wherein the key is inaccessible to the computing device; and
    obtaining the MAC from the secure component.

5. The method of claim 4, wherein using the MAC to maintain the integrity of the event log involves:
sending the event log to an auditing apparatus with access to the key; and
authenticating the event log using the auditing apparatus.

6. The method of claim 5, wherein the auditing apparatus authenticates the event log to detect corruption of the event log.

7. The method of claim 1, wherein the secure component is at least one of a smart card, an external computing device, and a secure software component.

8. A method for processing an event log for a computing device, comprising:
receiving a log entry, from the event log, for an event that has occurred on the computing device, wherein the log entry indicates an event description for the event, and indicates a message authentication code (MAC) associated with the event description;
responsive to receiving the log entry:
obtaining a key for the log entry, wherein the key is stored on a secure component associated with the computing device, wherein the secure component includes a secure key that is inaccessible to the computing device at which the event description and the associated MAC are stored; and
computing a MAC for the log entry using the key, wherein the MAC facilitates authenticating the event description using the secure key; and
using the computed MAC to authenticate the log entry.

9. The method of claim 8, further comprising:
using a counter associated with the log entry to further authenticate the log entry.

10. The method of claim 8, wherein using the computed MAC to authenticate the log entry involves:
comparing the computed MAC to a stored MAC for the log entry, wherein the stored MAC is computed by the secure component;
verifying an integrity of the log entry if the computed MAC is identical to the stored MAC; and
detecting corruption of the log entry if the computed MAC differs from the stored MAC.

11. The method of claim 8, wherein the event log is stored on the computing device or on an external storage device.

12. A system for facilitating use of a computing device, comprising:
a secure component configured to:
obtain an event description of an event that has occurred on the computing device, wherein the event description includes a description for one or more of: an application event; a system event; a network event; or a security event; and
compute a message authentication code (MAC) for the event description in response to obtaining the event description of the event, wherein the secure component includes a secure key that is inaccessible to the computing device at which the event description and MAC are stored, and wherein the MAC facilitates authenticating the event description using the secure key;
a storage mechanism configured to store the MAC and the event description in a log entry of an event log for the computing device, wherein the MAC is stored in association with the event description; and
an auditing apparatus configured to maintain the integrity of the event log, which contains one or more event descriptions, based on the associated MACs.

13. The system of claim 12,
wherein the secure component is further configured to increment a counter associated with the event log upon obtaining the event description, and
wherein the storage mechanism is further configured to store the counter in the event log.

14. The system of claim 12, wherein the secure component computes the MAC using a key that is inaccessible to the computing device.

15. The system of claim 14,
wherein the key is accessible to the auditing apparatus, and
wherein the auditing apparatus uses the MAC to maintain the integrity of the event log by:
obtaining a log entry containing the MAC and the event description from the event log; and
re-computing the MAC using the key and the event description.

16. The system of claim 12, wherein the event log is stored on the computing device or on an external storage device.

17. The system of claim 12, wherein the secure component is at least one of a smart card, an external computing device, and a secure software component.

18. A non-transitory computer-readable storage medium storing instructions that when executed by a computer cause the computer to perform a method for facilitating use of a computing device, the method comprising:
obtaining an event description for an event that has occurred on the computing device, wherein the event description includes a description for one or more of: an application event; a system event; a network event; or a security event;
responsive to obtaining the event description, computing a message authentication code (MAC) for the event description using a secure component associated with the computing device, wherein the secure component includes a secure key that is inaccessible to the computing device at which the event description and MAC are stored, and wherein the MAC facilitates authenticating the event description using the secure key;
storing the MAC, in a log entry of an event log, in association with the event description; and
maintaining the integrity of the event log, which contains one or more event descriptions, based on the associated MACs.

19. The computer-readable storage medium of claim 18, the method further comprising:
incrementing a counter associated with the event log upon obtaining the event description; and
storing the counter in the log entry.

20. The computer-readable storage medium of claim 18, wherein computing the MAC for the event description using the secure component involves:
providing the event description to the secure component;
computing the MAC using a key from the secure component, wherein the key is inaccessible to the computing device; and
obtaining the MAC from the secure component.

21. The computer-readable storage medium of claim 20, wherein using the MAC to maintain the integrity of the event log involves:
sending the event log to an auditing apparatus with access to the key; and
authenticating the event log using the auditing apparatus.

22. The computer-readable storage medium of claim 21, wherein the auditing apparatus authenticates the event log to detect corruption of the event log.

23. The computer-readable storage medium of claim 18, wherein the secure component is at least one of a smart card, an external computing device, and a secure software component.

\* \* \* \* \*